United States Patent
Seki et al.

(10) Patent No.: US 12,542,437 B2
(45) Date of Patent: Feb. 3, 2026

(54) REACTIVE POWER CONTROL DEVICE, REACTIVE POWER CONTROL METHOD, AND REACTIVE POWER CONTROL PROGRAM

(71) Applicant: TMEIC Corporation, Tokyo (JP)

(72) Inventors: Kosuke Seki, Tokyo (JP); Haiqing Li, Tokyo (JP)

(73) Assignee: TMEIC Corporation, Tokyo (JP)

( * ) Notice: Subject to any disclaimer, the term of this patent is extended or adjusted under 35 U.S.C. 154(b) by 220 days.

(21) Appl. No.: 18/259,363

(22) PCT Filed: Dec. 2, 2021

(86) PCT No.: PCT/JP2021/044344
§ 371 (c)(1),
(2) Date: Jun. 26, 2023

(87) PCT Pub. No.: WO2023/100333
PCT Pub. Date: Jun. 8, 2023

(65) Prior Publication Data
US 2024/0313538 A1 Sep. 19, 2024

(51) Int. Cl.
*H02J 3/18* (2006.01)
(52) U.S. Cl.
CPC ...................... *H02J 3/18* (2013.01)
(58) Field of Classification Search
CPC ..... H02J 3/16; H02J 3/18; H02M 7/48; Y02E 40/30
USPC .......................................................... 323/205
See application file for complete search history.

(56) References Cited

U.S. PATENT DOCUMENTS 10,971,991 B2 * 4/2021 Kato ................. H02M 7/53871
12,289,063 B2 * 4/2025 Bando ................. H02M 7/4835

FOREIGN PATENT DOCUMENTS

JP 2015-132988 A 7/2015

OTHER PUBLICATIONS

International Search Report and Written Opinion issued Feb. 15, 2022, in PCT/JP2021/044344 filed on Dec. 2, 2021.

* cited by examiner

*Primary Examiner* — Thienvu V Tran
*Assistant Examiner* — Lauren Ashley Shaw
(74) *Attorney, Agent, or Firm* — Oblon, McClelland, Maier & Neustadt, L.L.P.

(57) ABSTRACT

A reactive power control device includes a voltage acquisition unit that detects a grid voltage and a DC voltage; a modulation rate calculation unit that calculates a modulation rate; a reactive power command acquisition unit that obtains a first reactive power command from a host device; a blind zone determination unit that determines whether the first reactive power command is at a blind zone level; a reactive power command calculation unit that limits or compensates the first reactive power command according to the modulation rate and calculates a second reactive power command when the blind zone determination unit determines that the first reactive power command is not at the blind zone level; and a reactive power command output unit that outputs the second reactive power command when the second reactive power command is calculated, and outputs the first reactive power command when the second reactive power command is not calculated.

7 Claims, 13 Drawing Sheets

*SETTING OF BLIND ZONE LEVEL IS PERFORMED AT ACCURACY EQUAL TO OR HIGHER THAN ACCURACY OF CURRENT OR VOLTAGE SENSOR

[TABLE CONFIGURATION EXAMPLE]   31B

| MODULATION RATE | MODULATION RATE COMPENSATION GAIN |
|---|---|
| LIMITATION START LEVEL [MODULATION RATE: LOW] | 1.0 |
| : | : |
| (LIMITATION MAXIMUM LEVEL + START LEVEL)/2 [MODULATION RATE: MEDIUM] | 0.55 |
| : | : |
| LIMITATION MAXIMUM LEVEL [MODULATION RATE: HIGH] | 0.1 |

[S6C] CONTROL COMPENSATION

[S62C] PI CONTROL

REACTIVE POWER CONTROL DEVICE, REACTIVE POWER CONTROL METHOD, AND REACTIVE POWER CONTROL PROGRAM

FIELD

The present invention relates to a reactive power control device, a reactive power control method, and a reactive power control program.

BACKGROUND

Conventionally, a power conditioner has been known that generates a reactive power command according to the active power, thereby maintaining the operating power factor without being affected by the output accuracy of power generation equipment or the detection accuracy of an output power detector (see, for example, Patent Literature 1). Hereinafter, a power conditioner will also be referred to as a power converter or a power conditioning subsystem (PCS). Power conditioners for photovoltaic power generation are also called photovoltaics-power conditioning subsystems (PV-PCSs), and power conditioners for storage batteries are also called energy storage system-power conditioning subsystems (ESS-PCSs).

CITATION LIST

Patent Literature

[PTL1] JP 2015-132988 A

SUMMARY

Technical Problem

However, if a PV/ESS-PCS operates according to arbitrary active and reactive power commands, the reactive power output of the PCS may increase, causing the grid voltage to rise. In this case, the pulse width modulation (PWM) would be over-modulated, which may increase harmonics to the grid.

In other words, as the reactive power output of the PCS increases, the voltage of the impedances in the reactor components contained in the PCS and the grid also rises, which can result in an increase in the grid voltage. If the grid voltage continues to rise above a predetermined value, a limiter, for example, may operate to prevent the upper part of the sinusoidal waveform of the voltage from rising above a certain level and may make it distort into a trapezoidal shape. This may deform the waveform of the voltage, resulting in over-modulation of the PWM and an increase in harmonics to the grid.

Conventionally, even if the PWM is over-modulated, the PCS would continue to operate as long as it is within the fault detection level of the PCS, and the PCS would stop only when the fault detection level of the PCS is exceeded. However, if the waveform of the voltage deforms and the PWM is overmodulated to increase harmonics, the waveform of the current also deforms, which may adversely affect loads and equipment connected to the grid, causing them to malfunction or be damaged. Such adverse effects may include malfunction of relays or breakers connected to the grid, blown fuses, and video distortion or noise generation in video equipment.

Therefore, an object of this disclosure is to prevent a rise in the grid voltage by controlling the reactive power command according to the modulation rate of the PWM, and to prevent over-modulation of the PWM to suppress the increase of harmonics flowing out to the grid so that adverse effects to equipment and the like connected to the grid can be suppressed.

Solution to Problem

A reactive power control device according to one aspect includes: a voltage acquisition unit that detects a grid voltage and a DC voltage; a modulation rate calculation unit that calculates a modulation rate using the grid voltage and the DC voltage obtained by the voltage acquisition unit; a reactive power command acquisition unit that obtains a first reactive power command from a host device; a blind zone determination unit that determines whether the first reactive power command obtained by the reactive power command acquisition unit is at a blind zone level; a reactive power command calculation unit that limits or compensates the first reactive power command according to the modulation rate calculated by the modulation rate calculation unit and calculates a second reactive power command when the blind zone determination unit determines that the first reactive power command is not at the blind zone level; and a reactive power command output unit that outputs the second reactive power command when the second reactive power command is calculated by the reactive power command calculation unit, and outputs the first reactive power command when the second reactive power command is not calculated by the reactive power command calculation unit.

The reactive power control device according to the aspect further includes a command value polarity determination unit that determines whether the first reactive power command obtained by the reactive power command acquisition unit is greater than 0. The reactive power command calculation unit calculates the second reactive power command by limiting the first reactive power command in an inductive region when the command value polarity determination unit determines that the first reactive power command is greater than 0, and calculates the second reactive power command by limiting the first reactive power command in a capacitive region when the first reactive power command is determined to be less than 0.

In the reactive power control device according to the aspect, the reactive power command calculation unit starts limiting the first reactive power command when the modulation rate exceeds a predetermined limitation start level, and terminates limiting the first reactive power command when the modulation rate exceeds a predetermined limitation end level.

The reactive power control device according to the aspect further includes a storage in which a modulation rate compensation gain according to the modulation rate is stored as a table. The reactive power command calculation unit refers to the table stored in the storage to extract the modulation rate compensation gain according to the modulation rate, and multiplies the extracted modulation rate compensation gain by the first reactive power command to limit or compensate the first reactive power command, thereby calculating the second reactive power command.

The reactive power control device according to the aspect further includes a storage in which a predetermined modulation rate reference is stored. The reactive power command calculation unit calculates a difference or a deviation between the modulation rate reference stored in the storage and the modulation rate, performs PI control on the calculated difference or deviation, and adds a control amount determined by the PI control to the first reactive power command to limit or compensate the first reactive power command, thereby calculating the second reactive power command.

A reactive power control method according to one aspect includes: a voltage acquisition step of detecting a grid voltage and a DC voltage; a modulation rate calculation step of calculating a modulation rate using the grid voltage and the DC voltage obtained by the voltage acquisition step; a reactive power command acquisition step of obtaining a first reactive power command from a host device; a blind zone determination step of determining whether the first reactive power command obtained by the reactive power command acquisition step is at a blind zone level; a reactive power command calculation step of limiting or compensating the first reactive power command according to the modulation rate calculated by the modulation rate calculation step and calculating a second reactive power command when the blind zone determination step determines that the first reactive power command is not at the blind zone level; and a reactive power command output step of outputting the second reactive power command when the second reactive power command is calculated by the reactive power command calculation step, and outputting the first reactive power command when the second reactive power command is not calculated by the reactive power command calculation step.

A reactive power control program according to one aspect causes a computer to execute processing for the reactive power control method.

Advantageous Effects of Invention

This disclosure prevents a rise in the grid voltage by controlling the reactive power command according to the modulation rate of the PWM, and prevents over-modulation of the PWM to suppress the increase of harmonics flowing out to the grid so that adverse effects to equipment and the like connected to the grid can be suppressed.

DESCRIPTION OF EMBODIMENTS

A reactive power control device, a reactive power control method, and a reactive power control program of this disclosure will be described below with reference to accompanying drawings.

Configuration of First Embodiment

Figure 1:
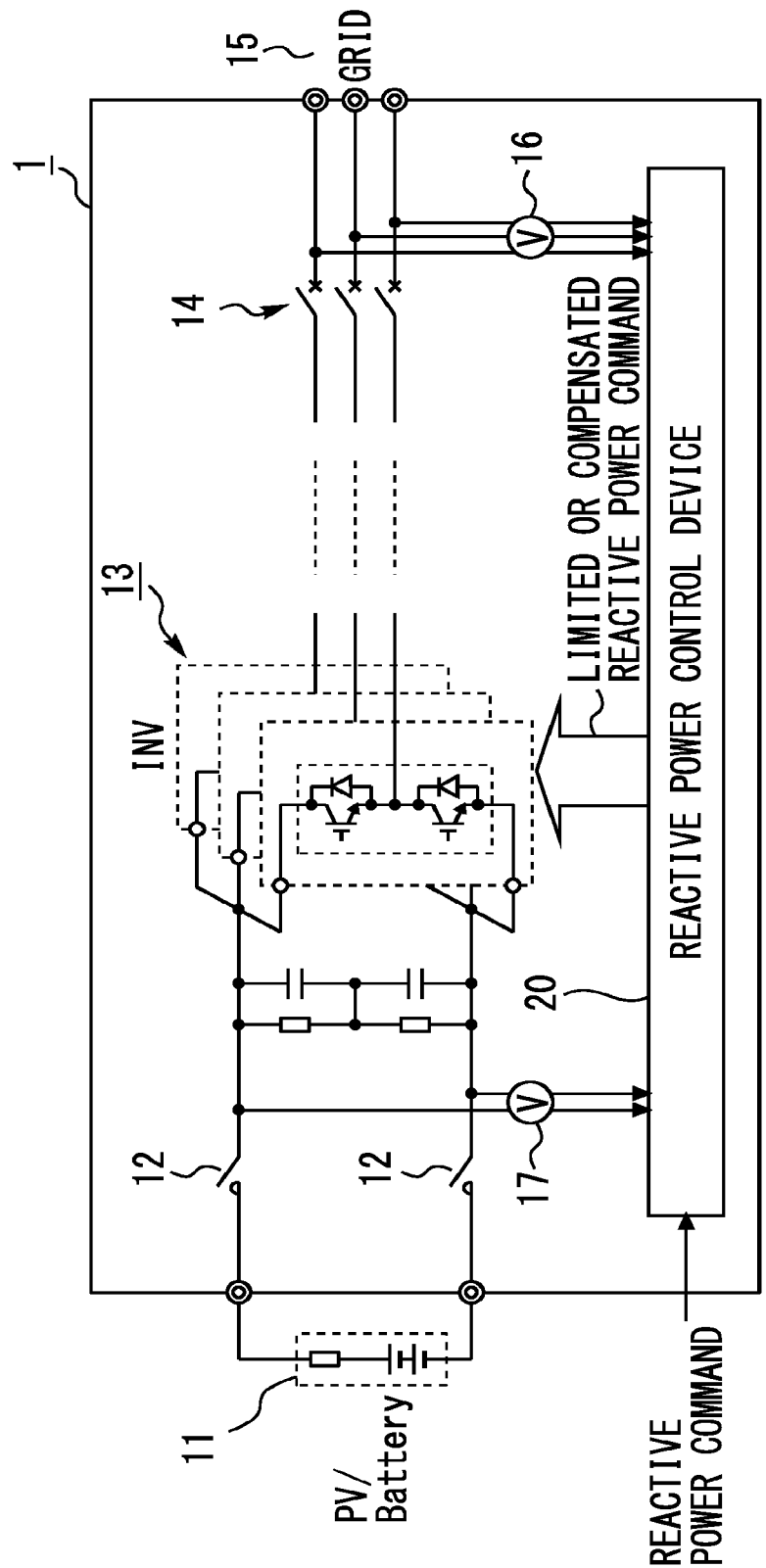
FIG. 1 is a diagram illustrating an example of the configuration of a power conditioner where a reactive power control device according to a first embodiment is located.

FIG. 1 is a diagram illustrating an example of the configuration of a power conditioner 1 where a reactive power control device 20 according to a first embodiment is located. The reactive power control device 20 shown in FIG. 1 is an example of the reactive power control device, the reactive power control method, and the reactive power control program of this disclosure.

As shown in FIG. 1, the power conditioner (PCS) 1 includes a DC power source 11, DC switches 12, an inverter 13, AC switches 14, an AC power grid 15, a grid voltage detector 16, a DC voltage detector 17, and the reactive power control device 20. The PCS 1 is, for example, a PV-PCS or ESS-PCS which converts DC power supplied from the DC power source 11 into AC power via the inverter 13 and outputs it to the AC power grid 15. Note that the descriptions and illustrations of the configurations of the PCS 1 that are not used in this embodiment will be omitted or simplified.

The DC power source 11 is connected to a DC terminal of the PCS 1. The DC power source 11 is, for example, a photovoltaic panel (photovoltaics (PV)) or a storage battery (energy storage system (ESS)) which supplies DC power to the PCS 1 through the DC terminal of the PCS 1. The DC power source 11 may be, for example, a DC power system consisting of a wind turbine generator, an AC-DC converter, and the like.

The DC switches (DC gates) 12 are installed in series with a DC bus bar between the DC power source 11 and a DC terminal of the inverter 13, and connect or open the DC bus bar according to a command to throw or open it from a control circuit not shown in the drawing or an operator. When the DC switches 12 are opened, the DC power supplied from the DC power source 11 is blocked from flowing into the inverter 13.

The inverter 13 is installed between the DC switches 12 and the AC switches 14 and includes a plurality of switching devices such as insulated gate bipolar transistors (IGBTs). The inverter 13 has an inverter control circuit not shown in the drawing, and the inverter control circuit generates pulse width modulation signals, which are gate drive signals for the switching devices. In accordance with the control of the inverter control circuit, the inverter 13 receives DC power supplied from the DC power source 11 from the DC terminal, converts it to AC power, and outputs it from an AC terminal.

The AC switches (AC gates) 14 are installed in series with a three-phase AC circuit between the AC terminal of the inverter 13 and the AC power grid 15, and connect or open the AC circuit according to a command to throw or open it from the control circuit not shown in the drawing or the operator. When the AC switch 14 is opened, the AC power supplied from the inverter 13 is blocked from flowing out to the AC power grid 15.

The AC power grid (grid) 15 is a system that integrates the generation, the transformation, the transmission, and the distribution to supply AC power output from the PCS 1 to power reception facilities of consumers, and is connected to, for example, unspecified loads and equipment.

The grid voltage detector 16 is, for example, a known AC voltmeter or an AC voltage sensor, which detects the grid voltage of the PCS 1. The grid voltage detector 16 can be installed anywhere the grid voltage of the PCS 1 can be measured, and is not limited to the location shown in FIG. 1. The value of the grid voltage measured by the grid voltage detector 16 is obtained by the reactive power control device 20.

The DC voltage detector 17 is, for example, a known DC voltmeter or a DC voltage sensor, which detects the DC voltage of the PCS 1. The DC voltage detector 17 can be installed anywhere the DC voltage of the PCS 1 can be measured, and is not limited to the location shown in FIG. 1. The value of the DC voltage measured by the DC voltage detector 17 is obtained by the reactive power control device 20.

The reactive power control device 20 is installed, for example, inside or outside the PCS 1, and is electrically connected to each component of the PCS 1, including the inverter 13, by wire or wirelessly, although wiring and the like are omitted in the drawing. The reactive power control device 20, for example, obtains the measured values from the grid voltage detector 16 and the DC voltage detector 17 and reactive power commands from a host device not shown in the drawing, calculates a limited or compensated reactive power command, and outputs the calculated limited or compensated reactive power command to the inverter 13. Note that the reactive power control device 20 may be implemented as a function of a control unit or an inverter control circuit (both not shown in the drawing) in the PCS 1.

Figure 2:
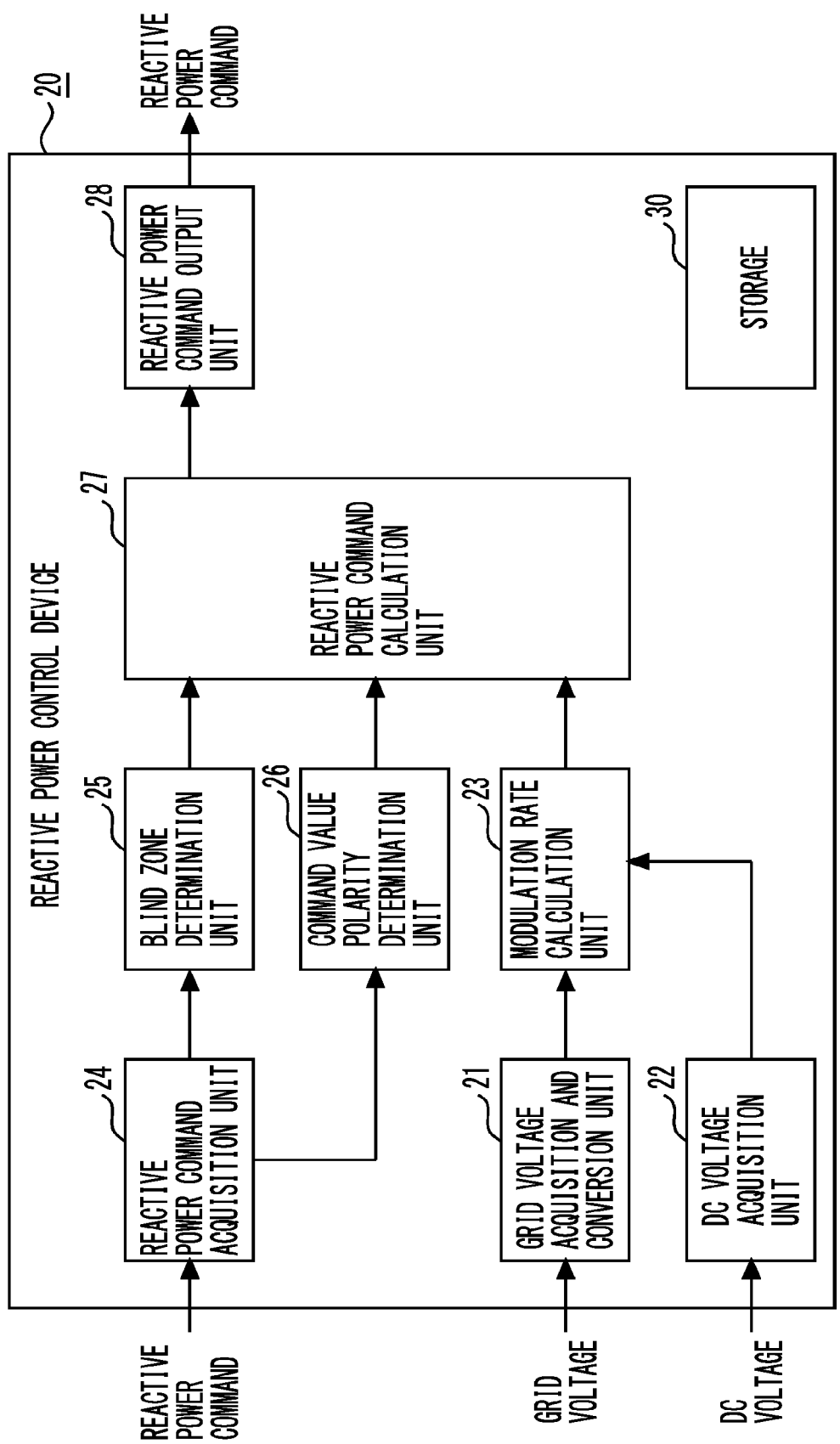
FIG. 2 is a diagram illustrating an example of the configuration of the reactive power control device according to the first embodiment shown in FIG. 1.

FIG. 2 is a diagram illustrating an example of the configuration of the reactive power control device 20 according to the first embodiment shown in FIG. 1.

The reactive power control device 20 includes, for example, a central processing unit (CPU), a graphics processing unit (GPU), or other processors (not shown in the drawing) that operate upon execution of a program. The reactive power control device 20 has a storage 30 and operates a processor (not shown in the drawing), for example, by executing a predetermined program stored in the storage 30, thereby comprehensively controlling the reactive power command for the PCS 1.

The reactive power control device 20 functions, for example, upon execution of a predetermined program stored in the storage 30, as a grid voltage acquisition and conversion unit 21, a DC voltage acquisition unit 22, a modulation rate calculation unit 23, and a reactive power command acquisition unit 24. Similarly, upon execution of a predetermined program, the reactive power control device 20 also functions as a blind zone determination unit 25, a command value polarity determination unit 26, a reactive power command calculation unit 27, and a reactive power command output unit 28. Note that the aforementioned functions may be implemented through the reactive power control program executed by an arithmetic processing unit included in the reactive power control device 20. Each of these functions may also be implemented using hardware.

The grid voltage acquisition and conversion unit 21 is connected to the grid voltage detector 16 and obtains the values of the grid voltages measured by the grid voltage detector 16. The grid voltage acquisition and conversion unit 21, for example, decomposes the obtained AC grid voltage values of the u-, v-, and w-phases into the respective DC components (dq conversion) and calculates the d- and q-axis values of the grid voltage. The grid voltage acquisition and conversion unit 21 outputs the d- and q-axis values of the grid voltage calculated by the dq conversion to the modulation rate calculation unit 23.

The DC voltage acquisition unit 22 is connected to the DC voltage detector 17 and obtains the DC voltage value measured by the DC voltage detector 17. The DC voltage acquisition unit 22 outputs the obtained DC voltage value to the modulation rate calculation unit 23. The grid voltage acquisition and conversion unit 21 and the DC voltage acquisition unit 22 are examples of "voltage acquisition unit."

The modulation rate calculation unit 23 obtains the d-axis value of the grid voltage and the q-axis value of the grid voltage output from the grid voltage acquisition and conversion unit 21, and the DC voltage value output from the DC voltage acquisition unit 22, and calculates the modulation rate based on these values. In other words, the modulation rate calculation unit 23 calculates the modulation rate based on the grid voltage value and the DC voltage value obtained by the grid voltage acquisition and conversion unit 21 and the DC voltage acquisition unit 22. The modulation rate calculation unit 23 outputs the calculated modulation rate to the reactive power command calculation unit 27. The specific operation of the modulation rate calculation unit 23 will be explained below.

The reactive power command acquisition unit 24 is wired or wirelessly connected to the host device not shown in the drawing, and obtains the reactive power commands output as analog commands in percentage, for example, from the host device not shown in the drawing. Note that the host device not shown in the drawing, for example, comprehensively monitors and controls multiple PCSs 1. The reactive power command output from the host device not shown in the drawing may vary, for example, according to the solar power generation status, arrangements with the power company, fluctuations in the grid voltage, and the like. The reactive power command acquisition unit 24 outputs the obtained reactive power command to the blind zone determination unit 25 and the command value polarity determination unit 26. The reactive power command output by the host device not shown in the drawing and obtained by the reactive power command acquisition unit 24 is an example of a "first reactive power command."

The blind zone determination unit 25 obtains the reactive power command output from the reactive power command acquisition unit 24 and determines whether the obtained reactive power command is at the blind zone level or not. The threshold for determining whether or not it is at a blind zone level is set, for example, at a value equal to or higher than the accuracy of a current sensor and a voltage sensor included in the PCS 1. The blind zone determination unit 25 outputs the result of the determination of whether or not it is at the blind zone level to the reactive power command calculation unit 27, and permits or blocks gate pulses from the reactive power command calculation unit 27. Note that the specific operation of the blind zone determination unit 25 will be explained below.

When the blind zone determination unit 25 determines that the reactive power command is not at the blind zone level, the command value polarity determination unit 26 obtains the reactive power command output from the reactive power command acquisition unit 24 and determines the polarity of the obtained reactive power command. In other words, the command value polarity determination unit 26 determines whether the obtained reactive power command is greater than 0 or less than 0. The command value polarity determination unit 26 outputs the determined polarity of the reactive power command to the reactive power command calculation unit 27. The specific operation of the command value polarity determination unit 26 will be described below.

The reactive power command calculation unit 27 obtains the modulation rate calculated by the modulation rate calculation unit 23, the determination result of whether or not the reactive power command is at the blind zone level determined by the blind zone determination unit 25, and the determination result of the polarity of the reactive power command determined by the command value polarity determination unit 26.

Upon acquisition of the determination result from the blind zone determination unit 25 that the reactive power command is not at the blind zone level, the reactive power command calculation unit 27 limits or compensates the reactive power command based on the modulation rate calculated by the modulation rate calculation unit 23 and calculates the limited or compensated reactive power command. The reactive power command calculation unit 27 then outputs the limited or compensated reactive power command to the reactive power command output unit 28. Note that the reactive power command limited or compensated by the reactive power command calculation unit 27 is an example of a "second reactive power command."

In contrast, upon acquisition of the determination result from the blind zone determination unit 25 that the reactive power command is at the blind zone level, the reactive power command calculation unit 27 does not limit or compensate the reactive power command and outputs the reactive power command (first reactive power command) as it is to the reactive power command output unit 28. The specific operation of the reactive power command calculation unit 27 will be described below.

The reactive power command output unit 28 outputs the first or second reactive power command output from the reactive power command calculation unit 27 to the inverter 13. In other words, when the limited or compensated reactive power command is calculated by the reactive power command calculation unit 27, the limited or compensated reactive power command (second reactive power command) is output to the inverter 13. In contrast, when the limited or compensated reactive power command has not been calculated by the reactive power command calculation unit 27, the reactive power command (first reactive power command) obtained by the reactive power command acquisition unit 24 is output as it is to the inverter 13.

The storage 30 is, for example, a volatile or nonvolatile storage medium, such as a hard disk drive (HDD), solid state drive (SSD), or semiconductor memory and stores, for example, programs necessary for the operation of each components of the reactive power control device 20. In addition, the storage 30 stores the obtained values, the calculation results, or the determination results given by the respective components of the reactive power control device 20. Note that the storage 30 may be provided outside the reactive power control device 20 and wired or wirelessly connected to the reactive power control device 20. The storage 30 may be an external storage medium, such as a memory card or digital versatile disc (DVD), or online storage.

Operation of First Embodiment

Figure 3:
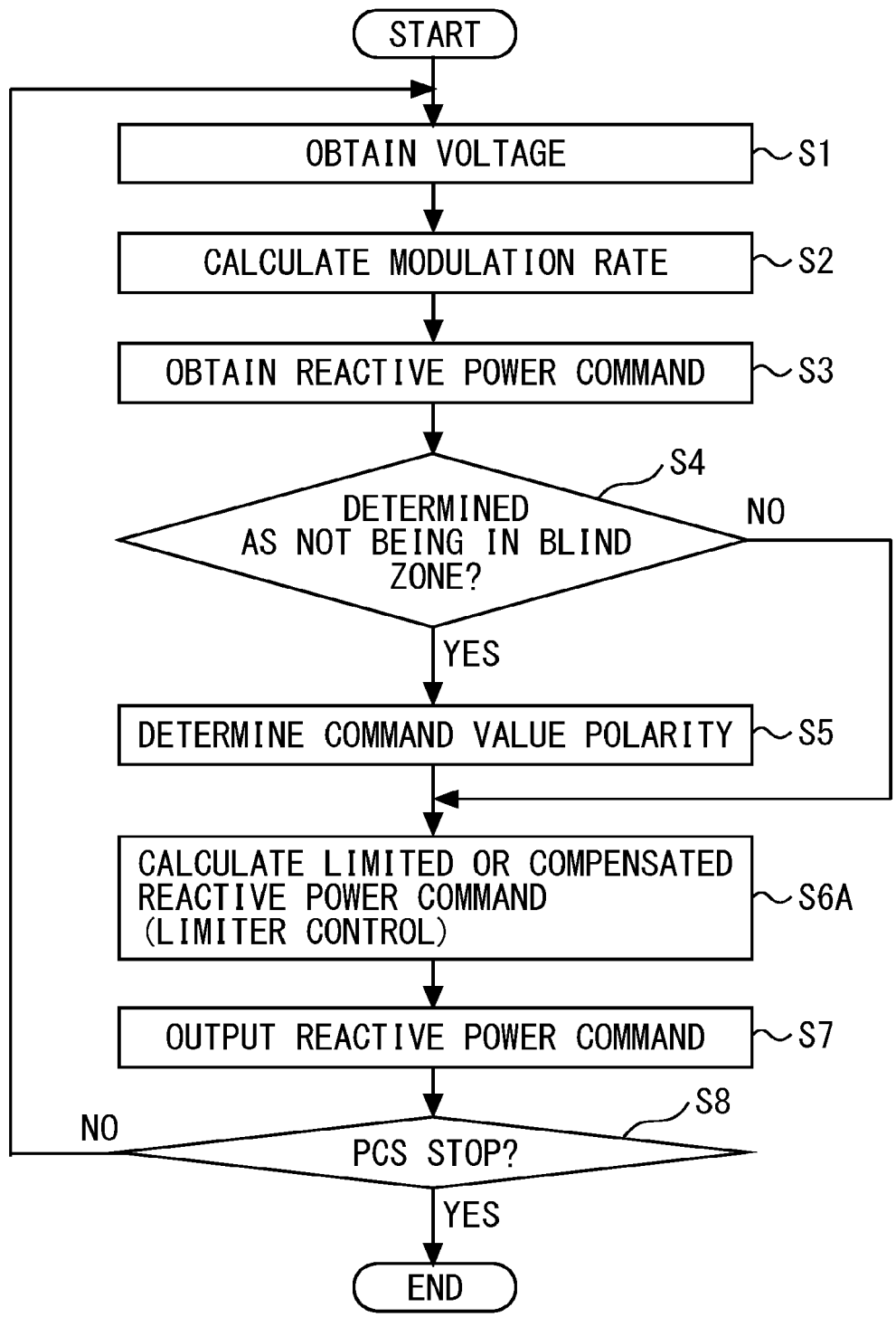
FIG. 3 is a flowchart of an example of the operation of the reactive power control device shown in FIG. 2.

FIG. 3 is a flowchart of an example of the operation of the reactive power control device 20 shown in FIG. 2. The flowchart in FIG. 3 is initiated, for example, when the PCS 1 is put into operation.

In Step S1, the reactive power control device 20 obtains the grid voltages and the DC voltage. In other words, the grid voltage acquisition and conversion unit 21 of the reactive power control device 20 obtains the grid voltage values measured by the grid voltage detector 16, performs the dq conversion, and calculates and obtains the d-axis value and the q-axis value of the grid voltage. The grid voltage acquisition and conversion unit 21 outputs the obtained d-axis value and q-axis value of the grid voltage to the modulation rate calculation unit 23. The DC voltage acquisition unit 22 of the reactive power control device 20 obtains the DC voltage value measured by the DC voltage detector 17. The DC voltage acquisition unit 22 outputs the obtained DC voltage value to the modulation rate calculation unit 23.

In Step S2, the reactive power control device 20 calculates the modulation rate. In particular, the modulation rate calculation unit 23 of the reactive power control device 20 obtains the d-axis value and the q-axis value of the grid voltage from the grid voltage acquisition and conversion unit 21 and the DC voltage value from the DC voltage acquisition unit 22, and calculates the modulation rate based on these values.

Figure 4:
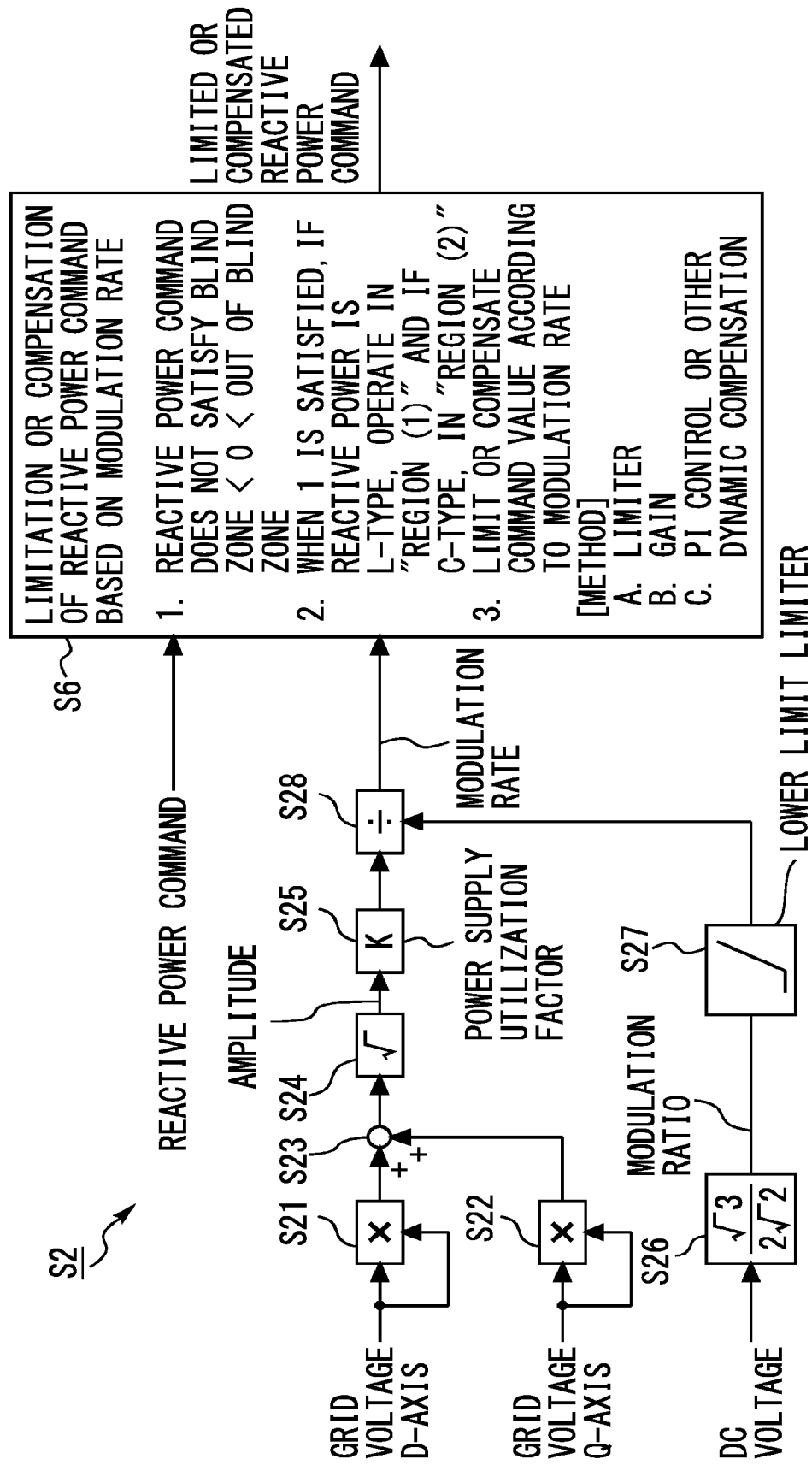
FIG. 4 is a diagram illustrating an example of the processing performed by a modulation rate calculation unit in Step S2 shown in FIG. 3.

FIG. 4 is a diagram illustrating an example of the processing performed by the modulation rate calculation unit 23 in Step S2 shown in FIG. 3.

In Step S21, the modulation rate calculation unit 23 determines the square of the d-axis value of the grid voltage.

In Step S22, the modulation rate calculation unit 23 determines the square of the q-axis value of the grid voltage.

In Step S23, the modulation rate calculation unit 23 calculates the sum of the value obtained in Step S21 and the value obtained in Step S22.

In Step S24, the modulation rate calculation unit 23 determines the square root of the value obtained in Step S23. The value obtained in Step S24 is the amplitude.

In Step S25, the modulation rate calculation unit 23 determines the product of the value (amplitude) obtained in Step S24 and a predetermined coefficient K. Here, the predetermined coefficient K is the one called the power supply utilization factor, for example, a value such as 85% or 115%. The power supply utilization factor (K) is a device-specific variable, for example, and is usually determined by the specifications of the device or the control method employed for the device.

In Step S26, the modulation rate calculation unit 23 multiplies the DC voltage value by a predetermined coefficient, ($\sqrt{3}/2\sqrt{2}$). Note that ($\sqrt{3}/2\sqrt{2}$) is an example of a predetermined coefficient (or variable) for determining the modulation ratio. The value obtained in Step S26 is the modulation ratio.

In Step S27, the modulation rate calculation unit 23 applies a lower limit limiter to the value (modulation ratio) determined in Step S26. This allows the modulation rate calculation unit 23 to prevent the value (modulation ratio) obtained in Step S26, which is used for calculation of the modulation rate, from falling below the predetermined value.

In Step S28, the modulation rate calculation unit 23 divides the value obtained in Step S25 by the value obtained in Step S27. The value obtained in Step S28 is the modulation rate. In particular, the modulation rate is the value obtained by dividing "the product of the amplitude of the grid voltage and a predetermined coefficient (the effective value of the grid voltage)" by "the product of the DC voltage and a predetermined coefficient (the DC voltage of the PCS 1)". The modulation rate calculation unit 23 outputs the value (modulation rate) obtained in Step S28 to the reactive power command calculation unit 27.

The aforementioned method of obtaining the modulation rate in Step S2 (S21 to S28) is merely illustrative and the method of obtaining the modulation rate is not limited to the aforementioned one. The operations described on the right side of FIG. 4 will be described below in relation to Step S6 (S6A, S6B, and S6C).

Referring back to FIG. 3, in Step S3, the reactive power command acquisition unit 24 obtains the reactive power command (first reactive power command) from the host device (not shown in the drawing). The reactive power command acquisition unit 24 outputs the obtained reactive power command to the blind zone determination unit 25 and the command value polarity determination unit 26.

In Step S4, the reactive power control device 20 determines whether the reactive power command (first reactive power command) is in the blind zone (at the blind zone level). In particular, the blind zone determination unit 25 of the reactive power control device 20 obtains the reactive power command from the reactive power command acquisition unit 24 and determines whether the obtained reactive power command is in the blind zone (at the blind zone level). When the blind zone determination unit 25 determines that the reactive power command (first reactive power command) is not in the blind zone (YES side), the process proceeds to Step S5. In contrast, when the blind zone determination unit 25 determines that the reactive power command (first reactive power command) is in the blind zone (NO side), the process proceeds to Step S6A.

Figure 5:
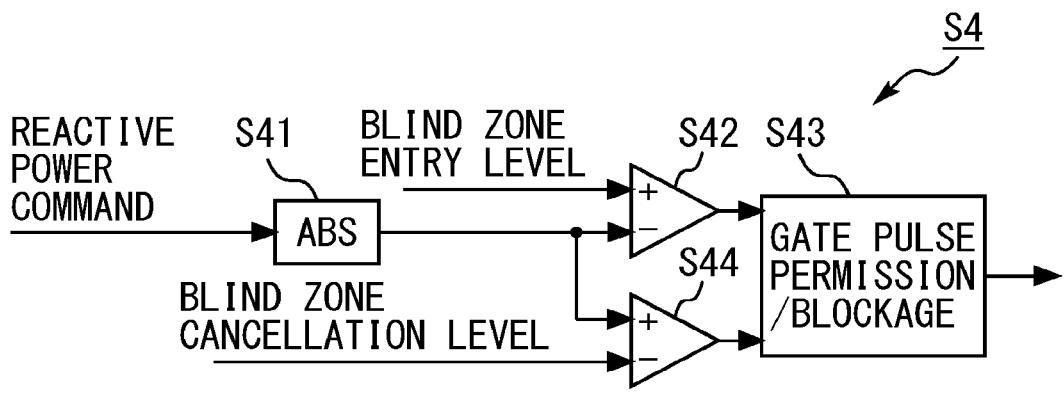
FIG. 5 is a diagram illustrating an example of the processing performed by a blind zone determination unit in Step S4 shown in FIG. 3.

FIG. 5 is a diagram illustrating an example of the processing performed by the blind zone determination unit 25 in Step S4 shown in FIG. 3.

In Step S41, the blind zone determination unit 25 determines the absolute value (ABS) of the reactive power command (first reactive power command).

In Step S42, the blind zone determination unit 25 determines whether the absolute value (ABS) of the reactive power command (first reactive power command) obtained in Step S41 is greater than a predetermined blind zone entry level.

If it is determined in Step S42 that the ABS of the reactive power command is greater than the predetermined blind zone entry level, the blind zone determination unit 25 determines that it is not at the blind zone level, and in Step S43, permits gate pulses and outputs this fact to the reactive power command calculation unit 27.

In contrast, when it is determined in Step S42 that the ABS of the reactive power command is smaller than the predetermined blind zone entry level, the blind zone determination unit 25 determines that it is at the blind zone level, and in Step S43, blocks the gate pulses and outputs this fact to the reactive power command calculation unit 27.

If the ABS of the reactive power command is determined to be at the blind zone level in Step S42, later in Step S44, the blind zone determination unit 25 determines whether the ABS of the reactive power command has exceeded a predetermined blind zone cancellation level.

In this case, it is determined in Step S44 that the ABS of the reactive power command has exceeded the predetermined blind zone cancellation level. In this case, the blind zone determination unit 25 determines that it is not at the blind zone level, and in Step S43, cancels the blockage of the gate pulses (permits the gate pulses) and outputs this fact to the reactive power command calculation unit 27.

In contrast, suppose that it is determined in Step S44 that the ABS of the reactive power command has not exceeded the predetermined blind zone cancellation level. In this case, the blind zone determination unit 25 determines that it is still at the blind zone level, and in Step S43, does not cancel the blockage of the gate pulses (keeps the blockage of the gate pulses) and outputs this fact to the reactive power command calculation unit 27.

Here, the threshold for determining whether it is at the blind zone entry level or the blind zone cancellation level is set, for example, at a value equal to or higher than the accuracy of the current sensor and the voltage sensor of the PCS 1. If the reactive power command is a very small value, for example, 1 to 2%, the PCS 1 may not be able to control this 1 to 2% depending on current or voltage errors, and the like. Accordingly, in such a case, the blind zone determination unit 25 determines that it is at the blind zone level. In this case, the gate pulses are blocked and the reactive power command of such a very small value of 1 to 2% is not controlled.

As an example, if the blind zone entry level in Step S42 in FIG. 5 is 3% and the ABS of the reactive power command is less than 3%, for example, the gate pulses are blocked and the reactive power command is not controlled in Step S43. Subsequently, for example, if the blind zone cancellation level in Step S44 in FIG. 5 is 5% and the ABS of the reactive power command is greater than or equal to 5%, the blockage of the gate pulses is canceled and the reactive power command is controlled in Step S43. In particular, when the reactive power command falls below 3%, control is no longer performed, and when the reactive power command becomes 5% or more afterward, control is restarted.

If the blind zone entry level and the blind zone cancellation level are set to the same value, the permission and the blockage fluctuate around this value, so the blind zone cancellation level is set higher than the blind zone entry level. For this reason, once the reactive power command falls below 3%, the gate pulses are blocked until the reactive power command becomes or exceeds 5%. In contrast, if the reactive power command has not fallen below 3%, the gate pulses are permitted even if, for example, the reactive power command is 4% which is below the blind zone cancellation level (5%).

Referring back to FIG. 3, in Step S5, the reactive power control device 20 determines the polarity of the command value of the reactive power command (first reactive power command). In particular, the command value polarity determination unit 26 of the reactive power control device 20 obtains the reactive power command from the reactive power command acquisition unit 24 and determines the polarity of the obtained reactive power command.

Figure 6:
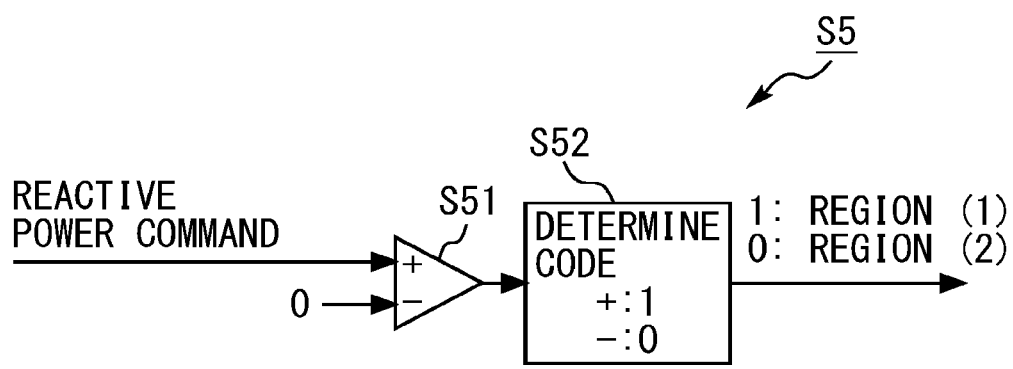
FIG. 6 is a diagram illustrating an example of the processing performed by a command value polarity determination unit in Step S5 shown in FIG. 3.

FIG. 6 is a diagram illustrating an example of the processing performed by the command value polarity determination unit 26 in Step S5 shown in FIG. 3.

In Step S51, the command value polarity determination unit 26 determines whether the reactive power command (first reactive power command) is greater than 0 or less than 0.

In Step S52, the command value polarity determination unit 26 performs code determination. In particular, if the reactive power command is greater than 0, the command value polarity determination unit 26 determines the code to be 1 and outputs the determination result (polarity), 1, to the reactive power command calculation unit 27. In contrast, if the reactive power command is less than 0, the command value polarity determination unit 26 determines the code to be 0 and outputs the determination result (polarity), 0, to the reactive power command calculation unit 27. If the reactive power command is 0, it is determined to be in the blind zone in Step S4 (NO side in Step S4), the processing in Step S5 (S51 to S52) is not performed in the first place.

In particular, the command value polarity determination unit 26 determines the reactive power command to be code 1 when it satisfies "blind zone<0<out of blind zone" (when it is positive), and outputs the determination result (polarity) of 1 to the reactive power command calculation unit 27. In contrast, the command value polarity determination unit 26 determines the reactive power command to be code 0 when it satisfies "out of blind zone<0<blind zone" (when it is negative), and outputs the determination result (polarity) of 0 to the reactive power command calculation unit 27. Although the details will be described later, when the code is 1, the polarity is inductive (L-type) and the reactive power command is limited in region (1), and when the code is 0, the polarity is capacitive (C-type) and the reactive power command is limited in region (2).

Referring back to FIG. 3, in Step S6A, the reactive power control device 20 limits the limiter to calculate the limited and compensated reactive power command (second reactive power command). In particular, the reactive power command calculation unit 27 of the reactive power control device 20 obtains the modulation rate from the modulation rate calculation unit 23, the result of the determination of whether the reactive power command is at the blind zone level from the blind zone determination unit 25, and the result of determination of the polarity of the reactive power command from the command value polarity determination unit 26.

When the reactive power command is determined by the blind zone determination unit 25 to be not at the blind zone level, the reactive power command calculation unit 27 calculates the limited or compensated reactive power command (second reactive power command value) according to the modulation rate calculated by the modulation rate calculation unit 23. The reactive power command calculation unit 27 then outputs the limited or compensated reactive power command (second reactive power command value) to the reactive power command output unit 28.

In contrast, when the reactive power command is determined by the blind zone determination unit 25 to be at the blind zone level, the reactive power command calculation unit 27 does not limit or compensate the reactive power command and outputs the reactive power command (first reactive power command) as it is to the reactive power command output unit 28.

Figure 7:
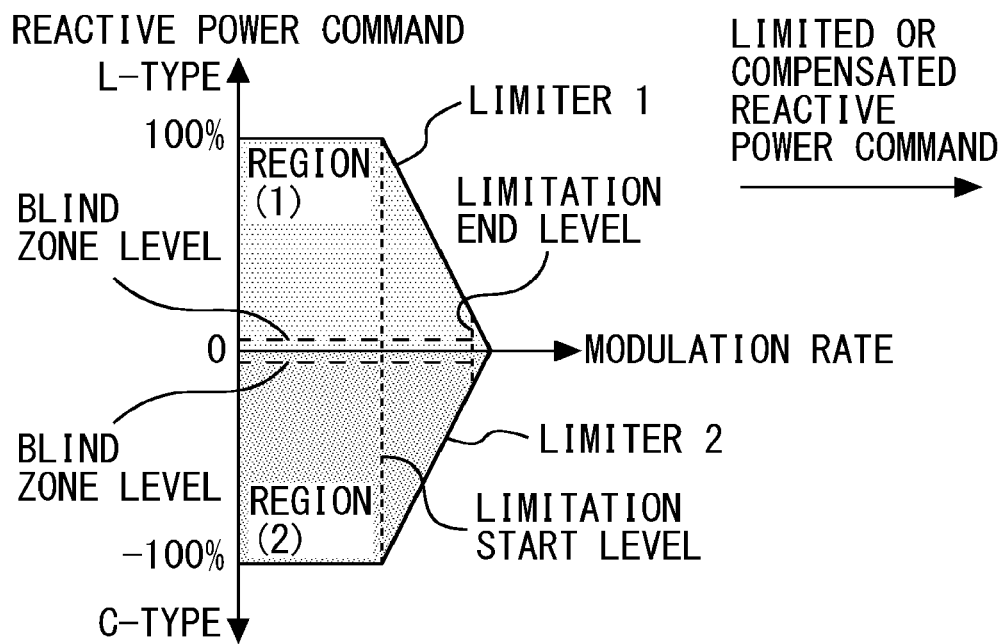
FIG. 7 is a diagram illustrating an example of the processing performed by a reactive power command calculation unit in Step S6A shown in FIG. 3.

FIG. 7 is a diagram illustrating an example of the processing performed by the reactive power command calculation unit 27 in Step S6A shown in FIG. 3. In FIG. 7, the vertical axis represents the reactive power command and the horizontal axis represents the modulation rate. The upper half region (1) shows induction (L-type) and the lower half region (2) shows capacity (C-type). In the region (1), a limiter 1 operates, and in the region (2), a limiter 2 operates.

The two dotted lines horizontally extending in the center represent the thresholds of the blind zone level, and when the reactive power command represented by the vertical axis is in the region between the two dotted lines representing the thresholds of the blind zone level, the reactive power command is at the blind zone level. For the vertically extending two dotted lines, the left one represents the threshold of the limitation start level and the right one represents the threshold of the limitation end level. When the modulation rate represented by the horizontal axis exceeds the limitation start level threshold, the limiter 1 or 2 operates and the reactive power command represented by the vertical axis is limited, and when the modulation rate represented by the horizontal axis exceeds the limitation end level, limitation on the reactive power command represented by the vertical axis ends. Note that the threshold of the limitation start level and the threshold of the limitation end level are set to predetermined values according to the specifications of the PCS 1, operating environment, operating conditions, a user, or the like, or prior simulations or design values.

In FIG. 7, for example, if the reactive power command obtained by the reactive power command calculation unit 27 is not at the blind zone level and is L-type, the reactive power command calculation unit 27 limits the reactive power command by operating the limiter 1 in the region (1) according to the obtained modulation rate. For example, the reactive power command calculation unit 27 does not limit the reactive power command in the region (1) when the obtained modulation rate does not exceed the limitation start level. Also, for example, when the obtained modulation rate is above the limitation start level and below the limitation end level, as shown in the drawing, the reactive power command calculation unit 27 operates the limiter 1 linearly in the region (1) to directly limit the reactive power command from +100% toward 0%. In particular, the reactive power command calculation unit 27 narrows the reactive power command so that the upper limit of the reactive power command falls within the limiter. Afterward, for example, when the obtained modulation rate exceeds the limitation end level, the reactive power command calculation unit 27 finishes limiting the reactive power command in the region (1).

In contrast, in FIG. 7, for example, if the reactive power command obtained by the reactive power command calculation unit 27 is not at the blind zone level and is C-type, the reactive power command calculation unit 27 limits the reactive power command by operating the limiter 2 in the region (2) according to the obtained modulation rate. For example, the reactive power command calculation unit 27 does not limit the reactive power command in the region (2) when the obtained modulation rate does not exceed the limitation start level. Also, for example, when the obtained modulation rate is above the limitation start level and below the limitation end level, as shown in the drawing, the reactive power command calculation unit 27 operates the limiter 2 linearly in the region (2) to directly limit the reactive power command from −100% toward 0%. In particular, the reactive power command calculation unit 27 narrows the reactive power command so that the upper limit of the reactive power command falls within the limiter. Afterward, for example, when the obtained modulation rate exceeds the limitation end level, the reactive power command calculation unit 27 finishes limiting the reactive power command in the region (2).

Using the aforementioned method, the reactive power command calculation unit 27 calculates the limited reactive power command (second reactive power command), and outputs the calculated reactive power command (second reactive power command value) to the reactive power command output unit 28.

When the limiter 1 or 2 does not operate, the reactive power command is not limited or compensated; consequently, the reactive power command (the second reactive power command) is not calculated. In this case, like in the case where the blind zone determination unit 25 has obtained the result of the determination that the reactive power command is at the blind zone level, the reactive power command calculation unit 27 outputs the reactive power command (the first reactive power command) as it is to the reactive power command output unit 28.

For example, when the limiter 1 or 2 does not operate (±100%), or when the limiter 1 or 2 operates according to the modulation rate but the obtained reactive power command is below the upper limit of the limiter 1 or 2 (e.g., ±90%), the obtained reactive power command is output without being limited. In contrast, when the limiter 1 or 2 operates according to the modulation rate and the obtained reactive power command is above the upper limit of the limiter (e.g., ±50%), the reactive power command is limited to ±50% of the upper limit and then output. In FIG. 7, the slopes of the limiters 1 and 2 are depicted as straight lines symmetrically above and below, but they may be asymmetrical or curved.

Referring back to FIG. 3, in Step S7, the reactive power control device 20 outputs the reactive power command. In particular, the reactive power command output unit 28 of the reactive power control device 20 outputs the first or second reactive power command output from the reactive power command calculation unit 27 to the inverter 13.

For example, when the limited or compensated reactive power command is calculated by the reactive power command calculation unit 27, the reactive power command output unit 28 outputs the limited or compensated reactive power command (the second reactive power command) to the inverter 13. In contrast, if the limited or compensated reactive power command is not calculated by the reactive power command calculation unit 27, the reactive power command output unit 28 outputs the reactive power command obtained by the reactive power command acquisition unit 24 (first reactive power command) as it is to the inverter 13.

In Step S8, the reactive power control device 20 determines whether the PCS 1 has stopped or not. When the reactive power control device 20 determines that the PCS 1 has stopped (YES side), the processing of the flowchart in FIG. 3 is terminated. In contrast, when the reactive power control device 20 determines that the PCS 1 has not stopped (NO side), the processing returns to Step S1 and the processing from Steps S1 to S8 is repeated.

Effects of First Embodiment

According to the aforementioned first embodiment shown in FIGS. 1 to 7, the modulation rate calculation unit 23 obtains the d-axis and q-axis values of the grid voltage from the grid voltage acquisition and conversion unit 21 and the DC voltage value from the DC voltage acquisition unit 22, and calculates the modulation rate based on these values (S2). This allows the reactive power control device 20 to control the reactive power command according to the modulation rate dependent on the grid voltage and the DC voltage of the PCS 1.

In addition, according to the first embodiment shown in FIGS. 1 to 7, the blind zone determination unit 25 obtains the reactive power command from the reactive power command acquisition unit 24 and determines whether the obtained reactive power command is in the blind zone (at the blind zone level) (S3). The threshold of whether or not it is at the blind zone entry level or the blind zone cancellation level is set at a value equal to or higher than the accuracy of the current and voltage sensors of the PCS 1, for example. This allows the reactive power control device 20 to control the reactive power command only for the controllable range.

Also, according to the first embodiment shown in FIGS. 1 to 7, the blind zone determination unit 25 sets the threshold value of the blind zone cancellation level greater than the threshold value of the blind zone entry level (S3). This allows the reactive power control device 20 to suppress fluctuations of the gate pulse blockage and permission around these values.

According to the first embodiment shown in FIGS. 1 to 7, upon acquisition of the result of the determination that the reactive power command (first reactive power command value) is not at the blind zone level, the reactive power command calculation unit 27 controls the reactive power command according to the obtained modulation rate (S6A). When the modulation rate is between the limitation start level and the limitation end level, the reactive power command (first reactive power command) is limited and the limited or compensated reactive power command (second reactive power command) is calculated. If the limited or compensated reactive power command (second reactive power command) is calculated, the reactive power command output unit 28 outputs the second reactive power command to the inverter 13, and if not calculated, the first reactive power command is output to the inverter 13 (S7). As a result, according to the first embodiment shown in FIGS. 1 to 7, the reactive power command can be controlled according to the modulation rate. Accordingly, the first embodiment shown in FIGS. 1 to 7 prevents a rise in the grid voltage and the PWM over-modulation, and suppresses an increase in harmonics flowing out to the grid, thereby suppressing the adverse effects on equipment connected to the grid and the like.

Second Embodiment

Figure 8:
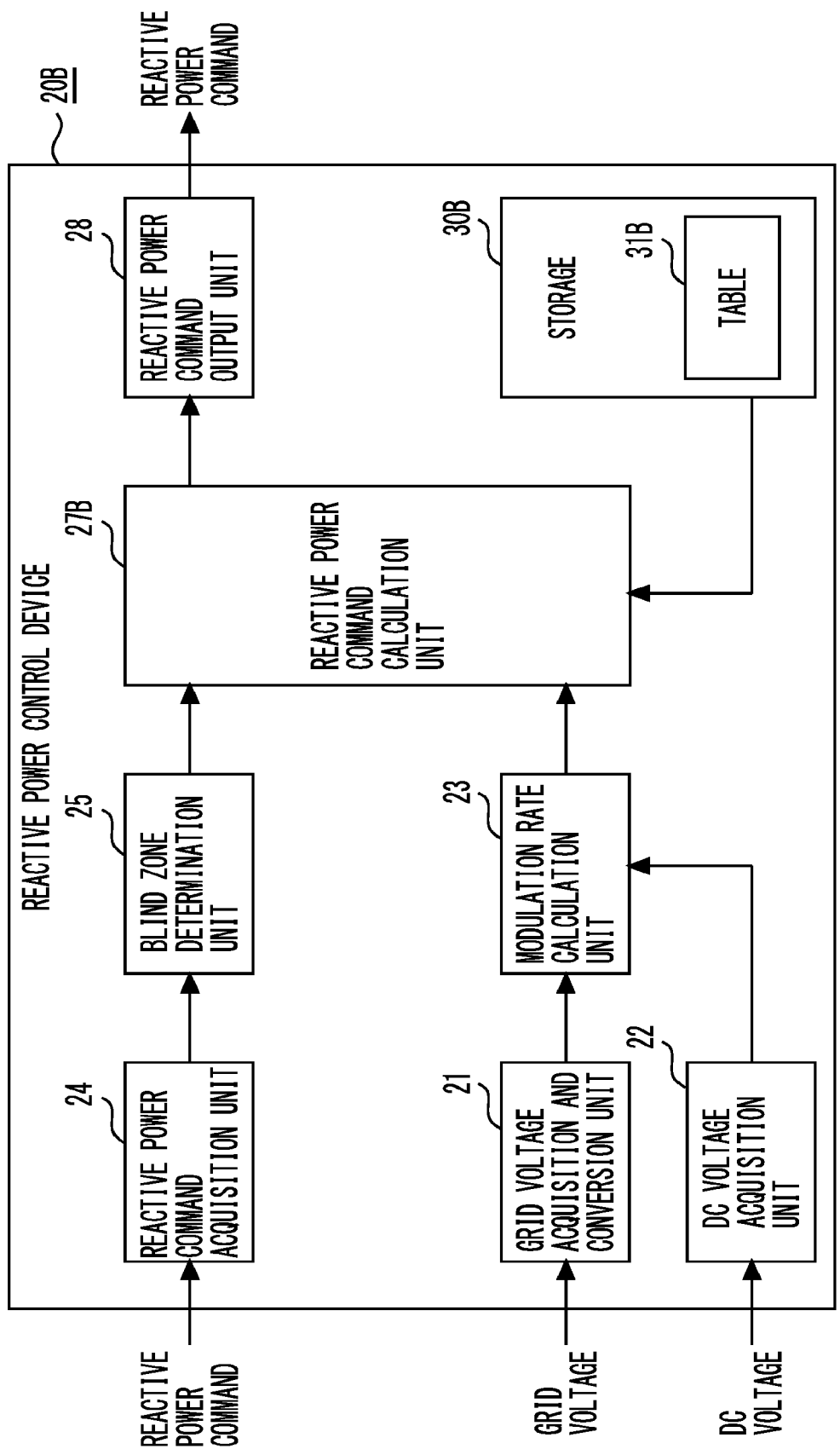
FIG. 8 is a diagram illustrating an example of the configuration of a reactive power control device according to a second embodiment.

FIG. 8 is a diagram illustrating an example of the configuration of a reactive power control device 20B according to a second embodiment. In the second embodiment, the same configurations as in the first embodiment shown in FIGS. 1 to 7 are denoted by the same reference numerals as therein, and the related detailed description will be omitted or simplified.

The reactive power control device 20 shown in FIG. 2 is provided with the command value polarity determination unit 26, while the reactive power control device 20B shown in FIG. 8 is not provided with the command value polarity determination unit 26. Also, the reactive power control device 20 shown in FIG. 2 is provided with the reactive power command calculation unit 27 and the storage 30, while in the reactive power control device 20B shown in FIG. 8, these are replaced by a reactive power command calculation unit 27B and a storage 30B.

The reactive power command calculation unit 27B obtains the modulation rate calculated by the modulation rate calculation unit 23, and the result of the determination of whether the reactive power command determined by the blind zone determination unit 25 is at the blind zone level. Since the reactive power control device 20B is not provided with the command value polarity determination unit 26, the reactive power command calculation unit 27B does not obtain the result of the determination of the polarity of the reactive power command.

Upon acquisition of the result of the determination that the reactive power command is not at the blind zone level by the blind zone determination unit 25, the reactive power command calculation unit 27B limits or compensates the reactive power command according to the modulation rate calculated by the modulation rate calculation unit 23, and calculates the limited or compensated reactive power command. The reactive power command calculation unit 27B then outputs the limited or compensated reactive power command (second reactive power command) to the reactive power command output unit 28.

In contrast, when the reactive power command is determined by the blind zone determination unit 25 to be at the blind zone level, the reactive power command calculation unit 27B does not limit or compensate the reactive power command and outputs the reactive power command (first reactive power command) as it is to the reactive power command output unit 28. The specific operation of the reactive power command calculation unit 27B will be described below.

The storage 30B has the same configuration and functions as the storage 30 shown in FIG. 2. The storage 30B further stores compensation gains for the modulation rate as a table (TABLE) 31B. As an example, the storage 30B stores, for example, a gain corresponding to a modulation rate of 0.5, a gain corresponding to a modulation rate of 0.6, and other gains corresponding to other modulation rates as the table 31B. Note that the values (coefficients) in the table 31B are set to predetermined values according to the specifications of the PCS 1, the operating environment, the operating conditions, the user, or the like, or the prior simulations or the design values. Note that the storage 30B is connected to the reactive power command calculation unit 27B, and the compensation gain values corresponding to the modulation rates stored as the table 31B are obtained and used by the reactive power command calculation unit 27B.

Figure 9:
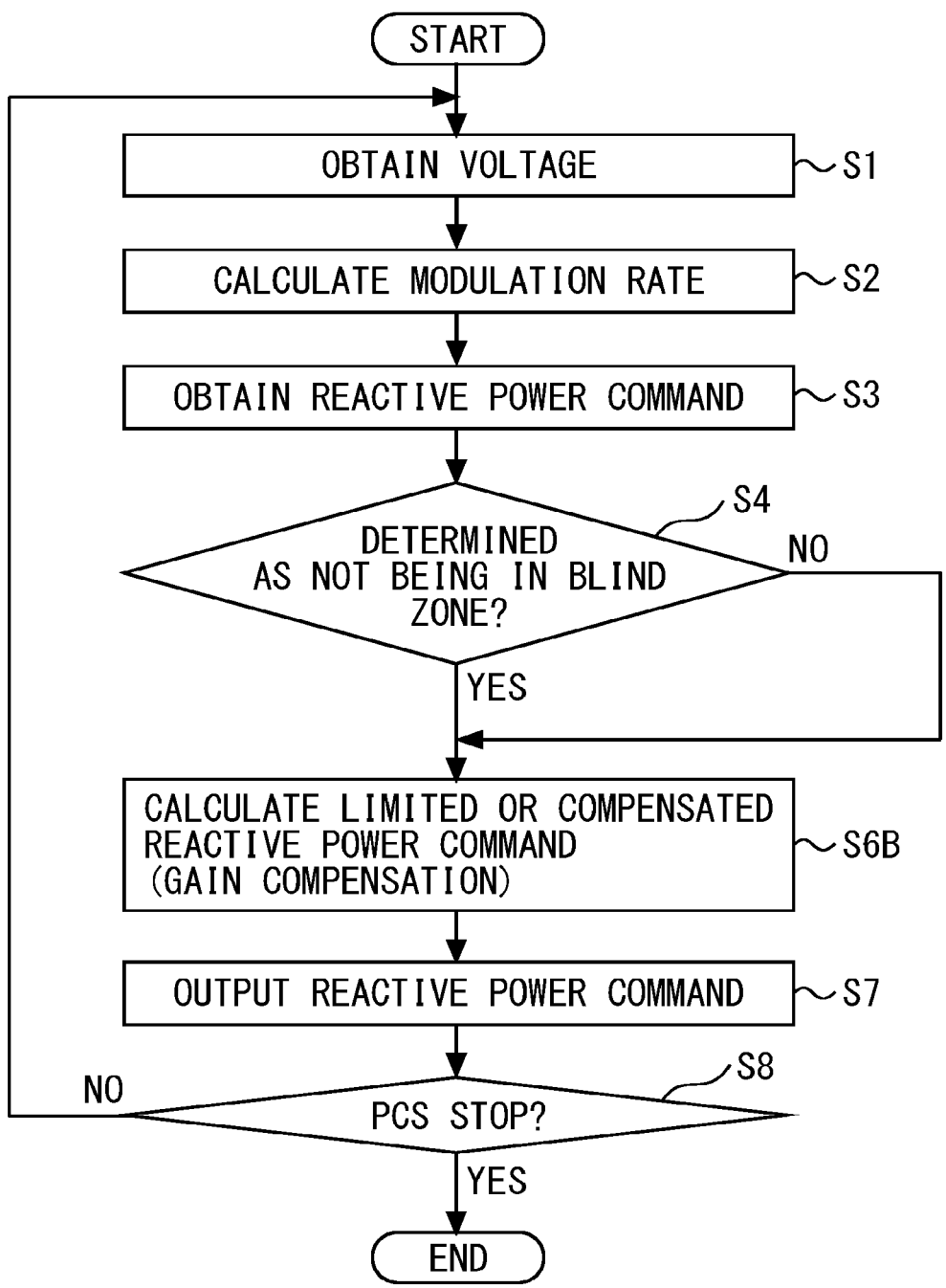
FIG. 9 is a flowchart of an example of the operation of the reactive power control device shown in FIG. 8.

FIG. 9 is a flowchart of an example of the operation of the reactive power control device 20B shown in FIG. 8. In the flowchart shown in FIG. 3, the processing of Step S5 is performed, while in the flowchart shown in FIG. 9, the processing of Step S5 is not performed. Also, in the flowchart shown in FIG. 3, the processing of Step S6A is performed, while in the flowchart shown in FIG. 9, this is replaced by Step S6B.

The flowchart shown in FIG. 9 below focuses on the facts that are different from the flowchart shown in FIG. 3, and omits or simplifies explanations of the facts similar to the flowchart shown in FIG. 3. Like the flowchart shown in FIG. 3, the flowchart shown in FIG. 9 is started, for example, when the operation of the PCS 1 is started.

In Step S6B, the reactive power control device 20B uses gain compensation to calculate the limited and compensated reactive power command value (second reactive power command value). In particular, the reactive power command calculation unit 27B of the reactive power control device 20B obtains the modulation rate from the modulation rate calculation unit 23 and the result of the determination of whether the reactive power command is at the blind zone level from the blind zone determination unit 25.

Upon acquisition of the result of the determination that the reactive power command is not at the blind zone level from the blind zone determination unit 25, the reactive power command calculation unit 27B calculates the limited or compensated reactive power command (second reactive power command) according to the modulation rate calculated by the modulation rate calculation unit 23. The reactive power command calculation unit 27B then outputs the limited or compensated reactive power command (second reactive power command value) to the reactive power command output unit 28.

In contrast, upon acquisition of the result of the determination that the reactive power command is at the blind zone level from the blind zone determination unit 25, the reactive power command calculation unit 27B does not limit or compensate the reactive power command and outputs the reactive power command (first reactive power command) as it is to the reactive power command output unit 28.

Figures 10, 11:
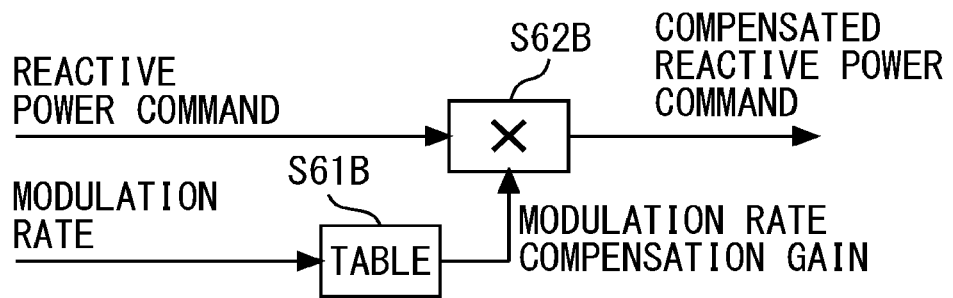
FIG. 10 is a diagram illustrating an example of the processing performed by a reactive power command calculation unit in Step S6B shown in FIG. 9.
FIG. 11 is a diagram illustrating an example of the configuration of a table shown in FIG. 7.

FIG. 10 is a diagram illustrating an example of the processing performed by the reactive power command calculation unit 27B in Step S6B shown in FIG. 9. FIG. 10 shows the processing in which the reactive power command calculation unit 27B obtains the result of the determination by the blind zone determination unit 25 that the reactive power command is not at the blind zone level.

In Step S61B, the reactive power command calculation unit 27B refers to the table (TABLE) 31B stored in the storage 30B to extract the modulation rate compensation gain according to the obtained modulation rate.

FIG. 11 is a diagram illustrating an example of the configuration of the table 31B shown in FIG. 7. In the table 31B shown in FIG. 11, the left column shows the modulation rate and the right column shows the modulation rate compensation gain.

For example, in the storage 30B, the fact that the modulation rate compensation gain value is 1.0 when the modulation rate is at the limitation start level [modulation rate: low] is associated and stored as the table 31B. Similarly, for example, in the storage 30B, the fact that the modulation rate compensation gain value is 0.55 when the modulation rate is (limitation maximum level+start level)/2 [modulation rate: medium] is associated and stored as the table 31B. Similarly, for example, in the storage 30B, the fact that the modulation rate compensation gain value is 0.1 when the modulation rate is at the limitation maximum level [modulation rate: high] is associated and stored as the table 31B.

This allows the reactive power command calculation unit 27B to, for example, refer to the table 31B shown in FIG. 11 to select and extract the modulation rate compensation gain according to the input value, i.e., the modulation rate. Note that, in the table 31B, the maximum and minimum values of the modulation rate and the modulation rate compensation gain depend on the design values, and the like. In the table 31B, the increments of the modulation rate and the modulation rate compensation gain depend on the size of the table 31B. Therefore, the maximum accuracy of the modulation rate compensation gain extracted by the reactive power command calculation unit 27B depends on the memory capacity of the storage 30B.

Referring back to FIG. 10, in Step S62B, the reactive power command calculation unit 27B multiplies the extracted modulation rate compensation gain by the reactive power command (first reactive power command), limits or compensates the first reactive power command, and calculates the limited or compensated reactive power command (second reactive power command). In particular, in this embodiment, the reactive power command is limited or compensated by multiplying the reactive power command by some coefficients. As a result, the reactive power command is adjusted with the modulation rate compensation gain, and the modulation rate is controlled. The reactive power command calculation unit 27B then outputs the limited or compensated reactive power command (second reactive power command) to the reactive power command output unit 28.

Effects of Second Embodiment

The aforementioned second embodiment shown in FIGS. 8 to 11 produces the same effects as the first embodiment shown in FIGS. 1 to 7.

In addition, according to the second embodiment shown in FIGS. 8 to 11, changing the table 31B stored in the storage 30B makes it possible to flexibly deal with changes in specifications, environment, and the like. Also, minutely setting the table 31B stored in the storage 30B allows the reactive power command to be limited or compensated minutely.

Third Embodiment

Figure 12:
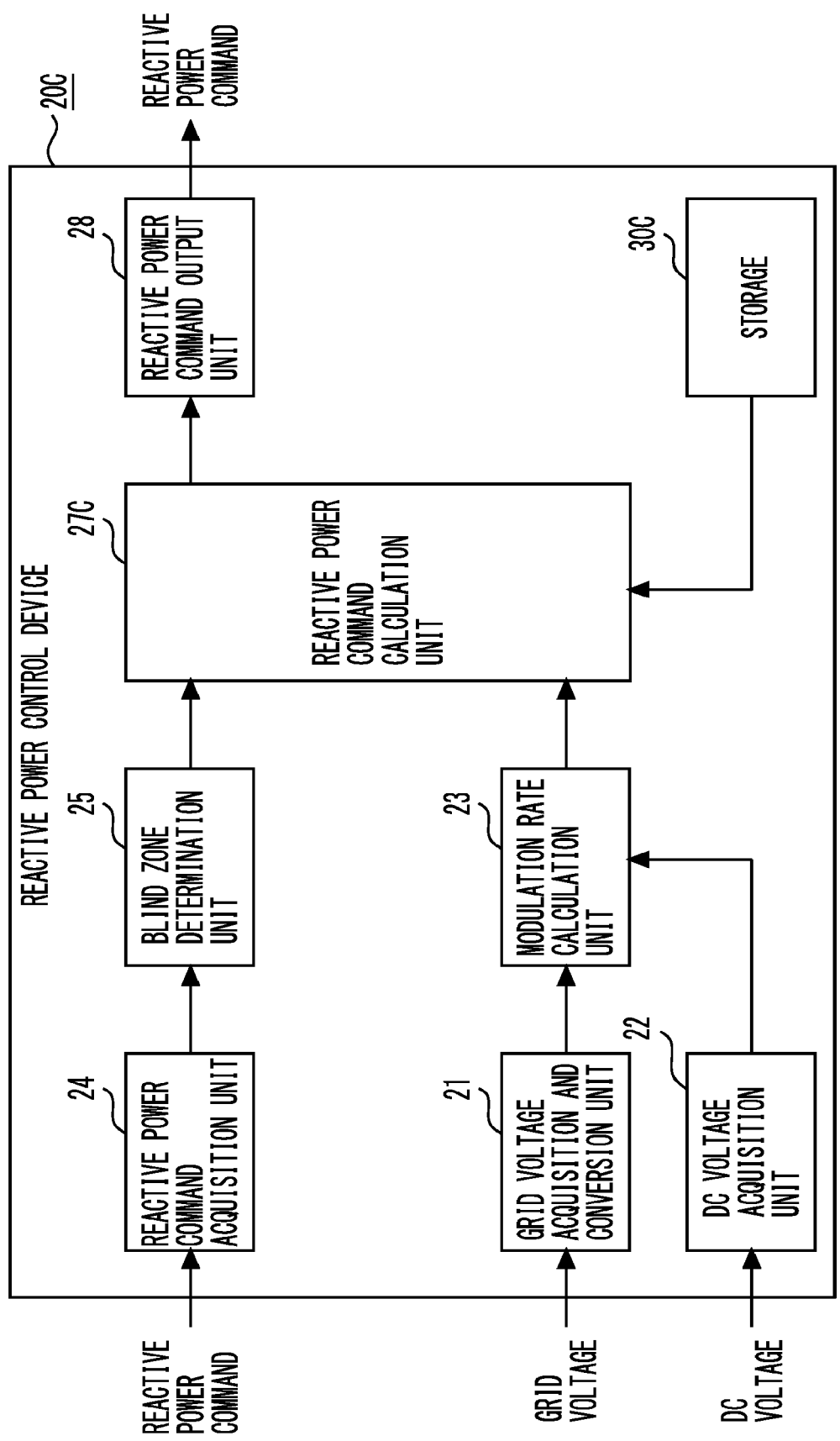
FIG. 12 is a diagram illustrating an example of the configuration of a reactive power control device according to a third embodiment.

FIG. 12 is a diagram illustrating an example of the configuration of a reactive power control device 20C according to a third embodiment. In the third embodiment, the same configurations as in the first embodiment shown in FIGS. 1 to 7 and the second embodiment shown in FIGS. 8 to 11 are denoted by the same reference numerals as therein, and the related detailed description will be omitted or simplified.

The reactive power control device 20 shown in FIG. 2 is provided with the command value polarity determination unit 26, while the reactive power control device 20C shown in FIG. 12 is not provided with the command value polarity determination unit 26 just like the reactive power control device 20B shown in FIG. 8. Also, the reactive power control device 20 shown in FIG. 2 is provided with the reactive power command calculation unit 27 and the storage 30, and in the reactive power control device 20B shown in FIG. 8, these are replaced by the reactive power command calculation unit 27B and storage 30B. In contrast, in the reactive power control device 20C shown in FIG. 12, these are replaced by a reactive power command calculation unit 27C and a storage 30C.

The reactive power command calculation unit 27C obtains the modulation rate calculated by the modulation rate calculation unit 23, and the result of the determination of whether the reactive power command determined by the blind zone determination unit 25 is at the blind zone level. Since the reactive power control device 20C is not provided with the command value polarity determination unit 26, the reactive power command calculation unit 27C does not obtain the result of the determination of the polarity of the reactive power command.

Upon acquisition of the result of the determination that the reactive power command is not at the blind zone level by the blind zone determination unit 25, the reactive power command calculation unit 27C limits or compensates the reactive power command according to the modulation rate calculated by the modulation rate calculation unit 23, and calculates the limited or compensated reactive power command. The reactive power command calculation unit 27C then outputs the limited or compensated reactive power command (second reactive power command) to the reactive power command output unit 28.

In contrast, upon acquisition of the result of the determination that the reactive power command is at the blind zone level by the blind zone determination unit 25, the reactive power command calculation unit 27C does not limit or compensate the reactive power command and outputs the reactive power command (first reactive power command) as it is to the reactive power command output unit 28. The specific operation of the reactive power command calculation unit 27C will be described below.

The storage 30C has the same configuration and functions as the storage 30 shown in FIG. 2. The storage 30C further stores modulate rate references according to the modulation rate. Note that the modulation rate reference is set to predetermined values according to the specifications of the PCS 1, the operating environment, the operating conditions, the user, or the like, or the prior simulations or the design values. Note that the storage 30C is connected to the reactive power command calculation unit 27C, and the modulation rate reference values are obtained and used by the reactive power command calculation unit 27C.

Figure 13:
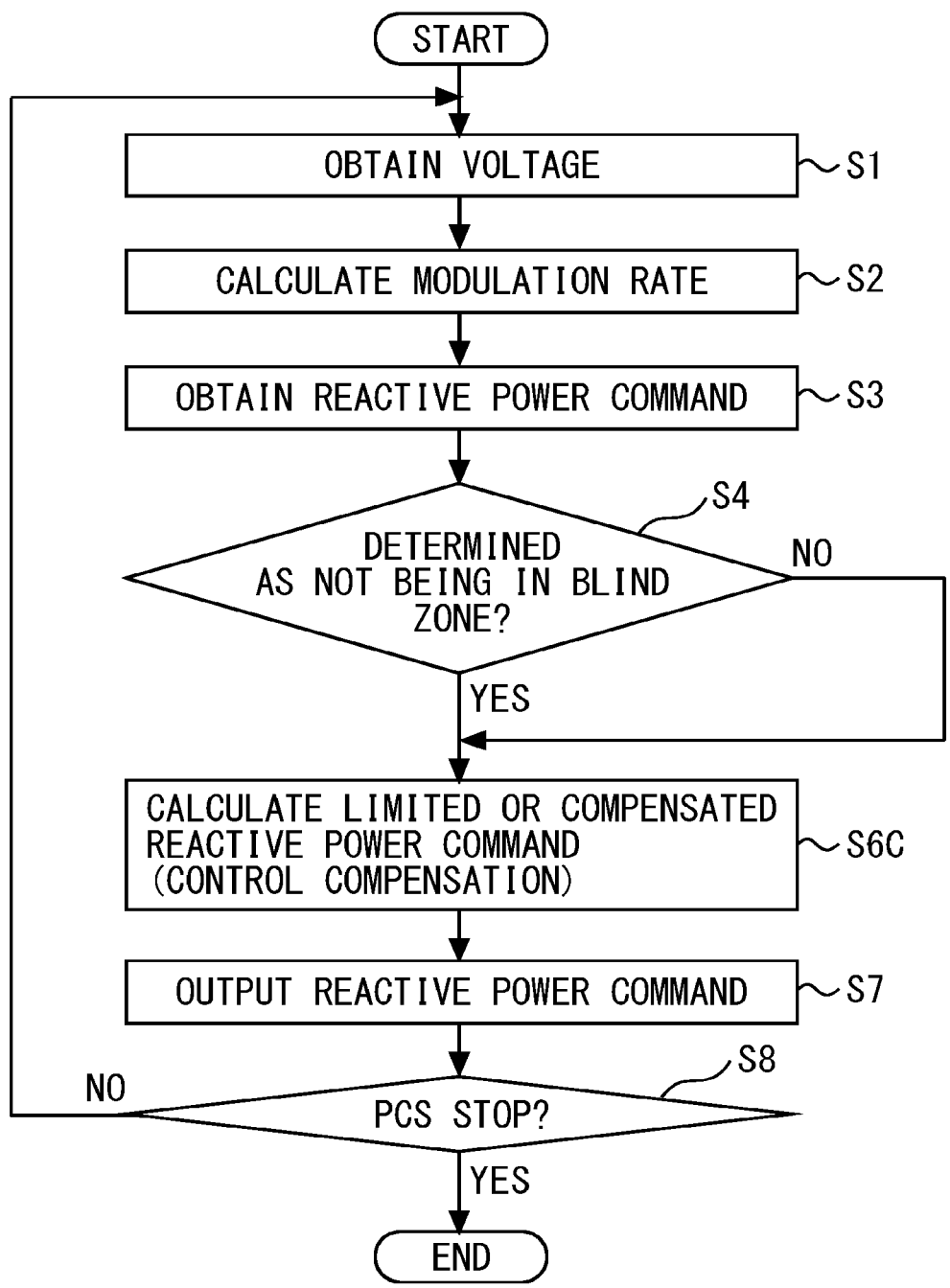
FIG. 13 is a flowchart of an example of the operation of the reactive power control device shown in FIG. 12.

FIG. 13 is a flowchart showing an example of the operation of the reactive power control device 20C shown in FIG. 12. In the flowchart shown in FIG. 3, the processing of Step S5 is performed, while in the flowchart shown in FIG. 13, the processing of Step S5 is not performed like in the flowchart shown in FIG. 9. Also, the processing of Step S6A is performed in the flowchart shown in FIG. 3 and this is replaced by Step S6B in the flowchart shown in FIG. 9, while in the flowchart shown in FIG. 13, this is replaced by Step S6C.

The flowchart shown in FIG. 13 below focuses on the facts that are different from the flowcharts shown in FIGS. 3 and 9, and omits or simplifies explanations of the facts similar to the flowcharts shown in FIGS. 3 and 9. Like the flowcharts shown in FIGS. 3 and 9, the flowchart shown in FIG. 13 is started, for example, when the operation of the PCS 1 is started.

In Step S6C, the reactive power control device 20C uses control compensation to calculate the limited and compensated reactive power command value (second reactive power command value). In particular, the reactive power command calculation unit 27C of the reactive power control device 20C obtains the modulation rate from the modulation rate calculation unit 23 and the result of the determination of whether the reactive power command is at the blind zone level from the blind zone determination unit 25.

Upon acquisition of the result of the determination that the reactive power command is not at the blind zone level from the blind zone determination unit 25, the reactive power command calculation unit 27C calculates the limited or compensated reactive power command (second reactive power command value) according to the modulation rate calculated by modulation rate calculation unit 23. The reactive power command calculation unit 27C then outputs the limited or compensated reactive power command (second reactive power command value) to the reactive power command output unit 28.

In contrast, upon acquisition of the result of the determination that the reactive power command is at the blind zone level from the blind zone determination unit 25, the reactive power command calculation unit 27C does not limit or compensate the reactive power command and outputs the reactive power command (first reactive power command) as it is to the reactive power command output unit 28.

Figure 14:
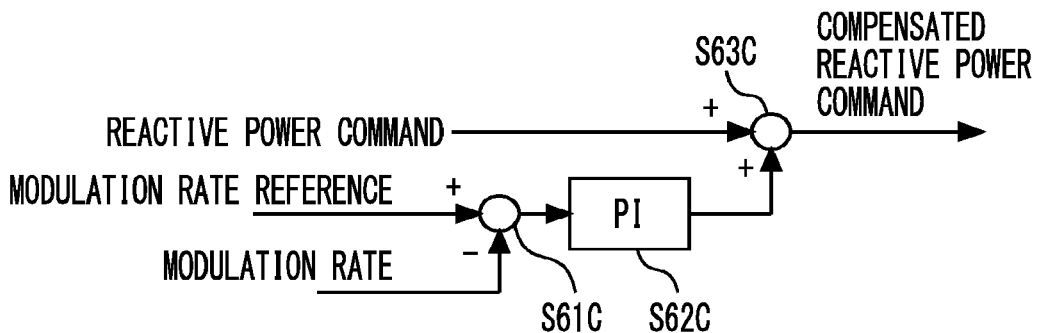
FIG. 14 is a diagram illustrating an example of the processing performed by a reactive power command calculation unit in Step S6C shown in FIG. 13.

FIG. 14 is a diagram illustrating an example of the processing performed by the reactive power command calculation unit 27C in Step S6C shown in FIG. 13. FIG. 13 shows the processing in which the reactive power command calculation unit 27C obtains the result of the determination by the blind zone determination unit 25 that the reactive power command is not at the blind zone level.

In Step S61C, the reactive power command calculation unit 27C obtains the modulation rate reference stored in the storage 30C and the current modulation rate calculated by the modulation rate calculation unit 23, and calculates the difference between the modulation rate reference and the current modulation rate.

In Step S62C, the reactive power command calculation unit 27C applies proportional-integral (PI) control to the difference obtained in Step S61C to obtain a control amount that reduces such a difference or a deviation to zero.

Figure 15:
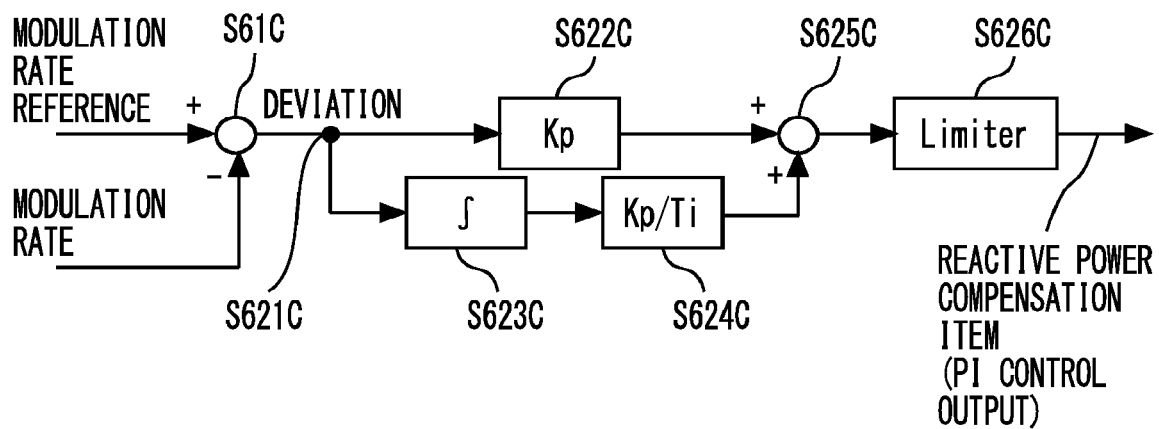
FIG. 15 is a diagram illustrating an example of the processing for PI control performed by a reactive power command calculation unit 27C in Step S62C shown in FIG. 14.

FIG. 15 is a diagram illustrating an example of the processing for the PI control performed by the reactive power command calculation unit 27C in Step S62C shown in FIG. 14. In FIG. 15, Step 62C shown in FIG. 14 is replaced by Steps S621C to S626C.

In Step S621C, the reactive power command calculation unit 27C determines the deviation of the difference between the modulation rate reference and the current modulation rate, determined in Step S61C.

In Step S622C, the reactive power command calculation unit 27C performs proportional control (P control) based on the deviation determined in Step S621C and Kp. Note that Kp is the proportional gain.

In Step S623C, the reactive power command calculation unit 27C integrates the deviation determined in Step S621C.

In Step S624C, the reactive power command calculation unit 27C performs integral control (I control) based on the integral of the deviation determined in Step S623C and Kp/Ti. Note that Kp is the proportional gain and Ti is the integral gain (time constant).

In Step S625C, the reactive power command calculation unit 27C determines the control amount which is the sum of the control amount determined by proportional control (P control) in S622C and the control amount determined by integral control (I control) in Steps S623C and S624C.

In Step S626C, the reactive power command calculation unit 27C multiplies the control amount determined in Step S625C by a predetermined limiter to determine the PI control output of a reactive power compensation item.

Referring back to FIG. 14, in Step S63C, the reactive power command calculation unit 27C adds the control amount determined in Step S62C to the reactive power command (the first reactive power command) and limits or compensates the first reactive power command and calculates the limited or compensated reactive power command (second reactive power command). In particular, in this embodiment, the reactive power command is limited or compensated by gradually adding the control amount obtained by the PI control to the reactive power command. The reactive power command calculation unit 27C then outputs the limited or compensated reactive power command (second reactive power command) to the reactive power command output unit 28.

If the control amount obtained in Step S62C is a negative value, the reactive power command calculation unit 27C adds the control amount, which is a negative value, to the reactive power command (first reactive power command) (as a result, the control amount is subtracted). Here, the reason that Step S62C is not a multiplication but an addition is that, for example, when there is no difference or deviation between the modulation rate reference and the current modulation rate and it is zero, zero is multiplied to prevent the reactive power command (second reactive power command) from becoming zero.

In the control compensation in Step S6C in FIG. 13 above, as shown in FIGS. 14 and 15, the PI control is applied to the deviation between the modulation rate reference and the input value, i.e., the modulation rate, and the modulation rate is controlled by adding the output of the PT control to the reactive power command. Note that the modulation rate reference is dependent on the design and other factors. For example, the modulation rate reference during equipment rated discharge operation may be a fixed value, or may be a variable value which can be an arbitrary set value externally input.

Effects of Third Embodiment

The aforementioned third embodiment shown in FIGS. 12 to 15 produces the same effects as the first embodiment shown in FIGS. 1 to 7.

According to the third embodiment shown in FIGS. 12 to 15, the modulation rate references stored in the storage 30C can be changed to flexibly deal with changes in specifications, environment, and other factors so that the reactive power command can be limited or compensated with high accuracy.

The third embodiment shown in FIGS. 12 to 15 allows the response speed at which the reactive power command is limited or compensated to vary according to the control speed of the PI control. In other words, speeding up the control speed of the PI control increases the response speed of limiting or compensating the reactive power command.

<Hardware Configuration Example>

Figure 16:
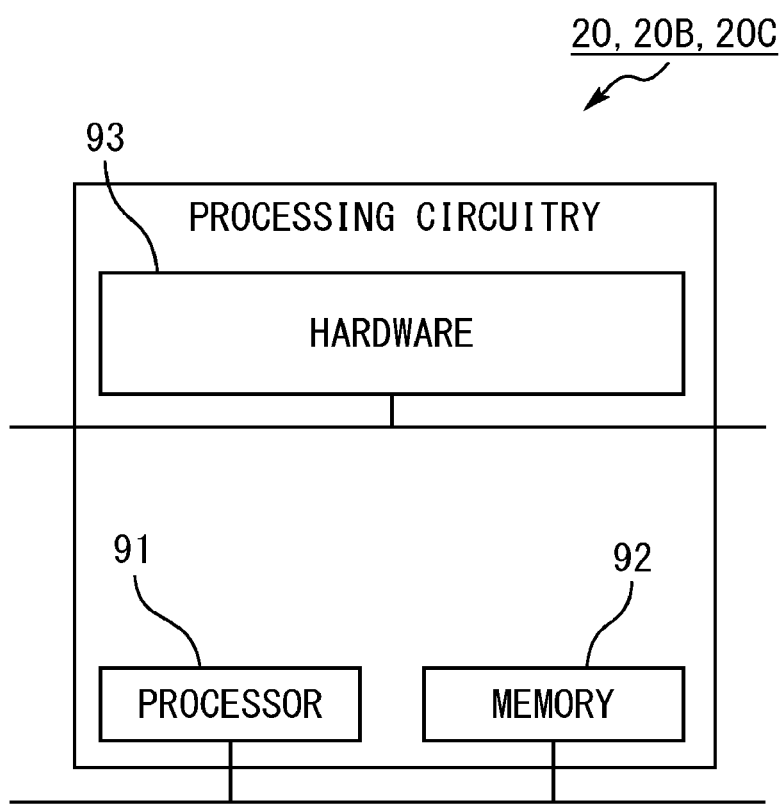
FIG. 16 is a conceptual diagram illustrating an example of the hardware configuration of processing circuitry of the reactive power control device according to the embodiments shown in FIGS. 1 to 15.

FIG. 16 is a conceptual diagram illustrating an example of the hardware configuration of processing circuitry of the reactive power control devices 20, 20B, and 20C according to the embodiments shown in FIGS. 1 to 15. The aforementioned functions are implemented using the processing circuitry. In one mode, the processing circuitry includes at least one processor 91 and at least one memory 92. In another mode, the processing circuitry includes at least one piece of dedicated hardware 93.

When the processing circuitry includes the processor 91 and the memory 92, each function is implemented using software, firmware, or a combination of software and firmware. At least one of the software and the firmware is written as a program. At least one of the software and the firmware is stored in the memory 92. The processor 91 reads and executes the program stored in the memory 92 to implement each function.

If the processing circuitry includes a piece of dedicated hardware 93, the processing circuitry is, for example, a single circuit, a complex circuit, a programmed processor, or a combination of these. Each function is implemented using the processing circuitry.

Each of the functions of the reactive power control devices 20, 20B, and 20C may be partly or entirely configured using hardware or configured as a program to be executed by a processor. In other words, the reactive power control devices 20, 20B, and 20C can each be implemented using a computer and a program which can be stored in a storage medium or provided through a network.

Supplemental Information on Embodiments

According to the aforementioned embodiments shown in FIGS. 1 to 16, the first embodiment shown in FIGS. 1 to 7, the second embodiment shown in FIGS. 8 to 11, and the third embodiment shown in FIGS. 12 to 15 are separated, which is not necessarily the case. Some or all of these embodiments may be combined in series or parallel. If the embodiments are combined, the combined embodiments can achieve all of the effects that the embodiments are supposed to produce before being combined.

In addition, according to the embodiments shown in FIGS. 1 to 16, one mode of this disclosure has been described as the reactive power control devices 20, 20B, and 20C as an example, but may be implemented as a reactive power control method in which the processing steps in each component of the reactive power control devices 20, 20B, and 20C are performed.

This disclosure can also be implemented as a reactive power control program that causes a computer to execute the processing steps in each component of the reactive power control devices 20, 20B, and 20C.

This disclosure can also be implemented as a storage medium (non-transitory computer readable medium) storing the reactive power control program. In particular, the reactive power control program can be stored, for example, on a compact disc (CD) or digital versatile disc (DVD), a removable medium such as a universal serial bus (USB) memory, or the like for distribution. Note that the reactive power control program may be downloaded from a network via a network interface or the like included in the reactive power control device 20, 20B, or 20C and stored in the storage 30, 30B, or 30C.

From the aforementioned detailed description, the features and advantages of the embodiments should be apparent. This means that the claims extend to the features and advantages of the embodiments described above without departing from the spirit and scope of the claims. In addition, those skilled in the art should be able to readily conceive all improvements and modifications. Accordingly, the scope of the inventive embodiments is not intended to be limited to that described above, and may be related to appropriate improvements and equivalents included in the scope disclosed in the embodiments.

REFERENCE SIGNS LIST

1 . . . Power conditioner, Power converter (PCS); 11 . . . DC power source; 12 . . . DC switch (DC gate); 13 . . . Inverter; 14 . . . AC switch (AC gate); 15 . . . AC power grid (grid); 16 . . . Grid voltage detector; 17 . . . DC voltage detector; 20, 20B, 20C . . . Reactive power control device; 21 . . . Grid voltage acquisition and conversion unit; 22 . . . DC voltage acquisition unit; 23 . . . Modulation rate calculation unit; 24 . . . Reactive power command acquisition unit; 25 . . . Blind zone determination unit; 26 . . . Command value polarity determination unit; 27, 27B, 27C . . . Reactive power command calculation unit; 28 . . . Reactive power command output unit; 30, 30B, 30C . . . Storage; 31B . . . Table (TABLE); 91 . . . Processor; 92 . . . Memory; 93 . . . Hardware; K . . . Coefficient

The invention claimed is:

1. A reactive power control device comprising:
a voltage acquisition unit that detects a grid voltage and a DC voltage;
a modulation rate calculation unit that calculates a modulation rate using the grid voltage and the DC voltage obtained by the voltage acquisition unit;
a reactive power command acquisition unit that obtains a first reactive power command from a host device;
a blind zone determination unit that determines whether the first reactive power command obtained by the reactive power command acquisition unit is at a blind zone level;
a reactive power command calculation unit that limits or compensates the first reactive power command according to the modulation rate calculated by the modulation rate calculation unit and calculates a second reactive power command when the blind zone determination unit determines that the first reactive power command is not at the blind zone level; and
a reactive power command output unit that outputs the second reactive power command when the second reactive power command is calculated by the reactive power command calculation unit, and outputs the first reactive power command when the second reactive power command is not calculated by the reactive power command calculation unit.

2. The reactive power control device according to claim 1, further comprising a command value polarity determination unit that determines whether the first reactive power command obtained by the reactive power command acquisition unit is greater than 0, wherein
the reactive power command calculation unit calculates the second reactive power command by limiting the first reactive power command in an inductive region when the command value polarity determination unit determines that the first reactive power command is greater than 0, and calculates the second reactive power command by limiting the first reactive power command in a capacitive region when the first reactive power command is determined to be less than 0.

3. The reactive power control device according to claim 1, wherein the reactive power command calculation unit starts limiting the first reactive power command when the modulation rate exceeds a predetermined limitation start level, and terminates limiting the first reactive power command when the modulation rate exceeds a predetermined limitation end level.

4. The reactive power control device according to claim 1, further comprising a storage in which a modulation rate compensation gain according to the modulation rate is stored as a table, wherein
the reactive power command calculation unit refers to the table stored in the storage to extract the modulation rate compensation gain according to the modulation rate, and multiplies the extracted modulation rate compensation gain by the first reactive power command to limit or compensate the first reactive power command, thereby calculating the second reactive power command.

5. The reactive power control device according to claim 1, further comprising a storage in which a predetermined modulation rate reference is stored, wherein
the reactive power command calculation unit calculates a difference or a deviation between the modulation rate reference stored in the storage and the modulation rate, performs PI control on the calculated difference or deviation, and adds a control amount determined by the PI control to the first reactive power command to limit or compensate the first reactive power command, thereby calculating the second reactive power command.

6. A reactive power control method comprising:
a voltage acquisition step of detecting a grid voltage and a DC voltage;

a modulation rate calculation step of calculating a modulation rate using the grid voltage and the DC voltage obtained by the voltage acquisition step;

a reactive power command acquisition step of obtaining a first reactive power command from a host device;

a blind zone determination step of determining whether the first reactive power command obtained by the reactive power command acquisition step is at a blind zone level;

a reactive power command calculation step of limiting or compensating the first reactive power command according to the modulation rate calculated by the modulation rate calculation step and calculating a second reactive power command when the blind zone determination step determines that the first reactive power command is not at the blind zone level; and a reactive power command output step of outputting the second reactive power command when the second reactive power command is calculated by the reactive power command calculation step, and outputting the first reactive power command when the second reactive power command is not calculated by the reactive power command calculation step.

7. A non-transitory computer-readable storage medium storing a reactive power control program that causes a computer to execute processing for the reactive power control method according to claim 6.

* * * * *